(12) United States Patent
Jiang et al.

(10) Patent No.: US 11,803,631 B2
(45) Date of Patent: Oct. 31, 2023

(54) BINDING A HARDWARE SECURITY TOKEN TO A HOST DEVICE TO PREVENT EXPLOITATION BY OTHER HOST DEVICES

(71) Applicant: ARRIS Enterprises LLC, Suwanee, GA (US)

(72) Inventors: Oscar Jiang, West Covina, CA (US); Ting Yao, San Diego, CA (US); Xin Qiu, San Diego, CA (US); Jason Pasion, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 373 days.

(21) Appl. No.: 17/308,881

(22) Filed: May 5, 2021

(65) Prior Publication Data

US 2021/0349986 A1 Nov. 11, 2021

Related U.S. Application Data

(60) Provisional application No. 63/020,915, filed on May 6, 2020.

(51) Int. Cl.
*G06F 21/44* (2013.01)
*H04L 9/08* (2006.01)
*H04L 9/30* (2006.01)

(52) U.S. Cl.
CPC .............. *G06F 21/44* (2013.01); *H04L 9/088* (2013.01); *H04L 9/30* (2013.01)

(58) Field of Classification Search
CPC ......... G06F 21/44; G06F 21/73; H04L 9/088; H04L 9/30; H04L 9/0825; H04L 9/0877; H04L 9/3247; H04L 9/0897
See application file for complete search history.

(56) References Cited

U.S. PATENT DOCUMENTS

| 9,369,469 | B2 * | 6/2016 | Gregg | H04L 63/0853 |
| 2003/0005300 | A1 * | 1/2003 | Noble | G06F 21/6227 713/168 |
| 2003/0115455 | A1 * | 6/2003 | Aull | H04L 63/0853 713/156 |

(Continued)

FOREIGN PATENT DOCUMENTS

WO WO-2011066658 A1 * 6/2011 ........... G06F 21/335

OTHER PUBLICATIONS

Julian Horsch, CoKey: Fast Token-Based Cooperative Cryptography, ACSAC '16: Proceedings of the 32nd Annual Conference on Computer Security Applications Dec. 2016 pp. 314-323https://doi.org/10.1145/2991079.2991117, Published:Dec. 5, 2016 (Year: 2016).*

*Primary Examiner* — Shahriar Zarrineh
(74) *Attorney, Agent, or Firm* — Chernoff, Vilhauer, McClung & Stenzel, LLP (57) ABSTRACT

A system and method described below prevents exploitation of a client's PKI station using the a token installed on other host (attackers') processors. This is accomplished by binding the token to the approved PKI client station (host) using the a software development kit installed in the PKI client station. Once a token is bound to a PKI client station, the token can no longer be used on another station unless permitted by authorized personnel.

14 Claims, 7 Drawing Sheets

(56) References Cited

U.S. PATENT DOCUMENTS

| | | | |
|---|---|---|---|
| 2003/0115467 A1* | 6/2003 | Aull | H04L 9/0897 |
| | | | 713/173 |
| 2005/0123142 A1* | 6/2005 | Freeman | H04L 9/0891 |
| | | | 713/155 |
| 2009/0031131 A1* | 1/2009 | Qiu | H04L 63/0442 |
| | | | 713/172 |
| 2014/0281506 A1* | 9/2014 | Redberg | H04L 63/0876 |
| | | | 713/159 |
| 2015/0341325 A1* | 11/2015 | Al Jabri | H04L 9/0825 |
| | | | 713/156 |
| 2016/0248595 A1* | 8/2016 | Buer | H04L 9/321 |
| 2017/0195121 A1* | 7/2017 | Frei | H04L 9/0825 |
| 2018/0205542 A1* | 7/2018 | Bone | H04W 12/35 |
| 2019/0296918 A1* | 9/2019 | Chang | H04L 9/006 |
| 2019/0334718 A1* | 10/2019 | Li | H04W 12/0471 |
| 2019/0334884 A1* | 10/2019 | Ross | G06F 21/41 |

* cited by examiner

BINDING A HARDWARE SECURITY TOKEN TO A HOST DEVICE TO PREVENT EXPLOITATION BY OTHER HOST DEVICES

CROSS REFERENCE TO RELATED APPLICATIONS

The present application claims priority under 35 U.S.C. § 119(e) to U.S. Provisional Application No. 63/020,915.

BACKGROUND

1. Field

The present disclosure relates to systems and methods for providing cryptographic data, and in particular to a system and method for binding processing elements used to request such cryptographic data.

2. Description of the Related Art

It is common for vendors to supply software development kits (SDKs) to clients so that clients can develop and use software on their processing systems. In cases were higher security is required, such SDKs often employ hardware security modules (HSMs) such as USB tokens (eTokens), also provided by the vendor for use by the client. For example, a Public Key Infrastructure (PKI) center produces keys and digital certificates for clients' use. The PKI center issues USB HSM tokens and an SDK to the client so that the client can obtain keys and digital certificates. The client distributes its software and the SDK to its Service Centers (SCs) along with a PKI client station that is used to request secure data such as keys and digital certificates from the PKI Center servers.

In some circumstances, the PKI client stations can be compromised by attackers over the internet using the eTokens from another host (USB over IP). What is needed is a system and method that prevents exploitation of a client's PKI station using the eToken installed on other host (attackers') processors.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To address the requirements described above, this document discloses a system and method for managing a binding of a hardware token to a host device. In one embodiment, the method comprises determining if the token is bound to the host device, and if the token is not bound to the host device, binding the token to the host device. Binding the token to the host device comprises retrieving fingerprint data from the host device, generating, by the token, a private binding key and a public key, encrypting the fingerprint data according to the public key, saving the encrypted fingerprint data on the token, and transmitting a token identifier, the fingerprint data, and the public key to a token binding service remote from the host device. If the token is bound to the host device, the method comprises re-retrieving the fingerprint data from the host device, retrieving the encrypted fingerprint data from the token, decrypting the encrypted fingerprint data according to the private binding key, comparing the decrypted fingerprint data with the re-retrieved fingerprint data, and transmitting a request for cryptographic data based upon the comparison.

Another embodiment is evidenced by an apparatus having a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

The system and method described below prevents exploitation of a client's PKI station using the eToken installed on other host (attackers') processors. This is accomplished by binding the token to a PKI client station (host) using the SDK. Once a token is bound to a PKI client station, the token can no longer be used on another station unless permitted by authorized personnel. It utilizes the processing capability and storage of the token, a fingerprint of the host computer and asymmetric cryptography. Cryptographic operations are applied on the data stored in token and use the stored data on later time to verify it's be used by original host.

This provides advantages over other possible techniques to prevent exploitation of a client's PKI station using tokens installed on other computers. For example, although a password might be able to be used to secure access to the token 108, the password itself cannot be secure, because it can be extracted from a data link library (DLL) application program interface (API) calls using widely available tools. In another example, although tokens may be replaced with new tokens that have additional authentication factors (one time passwords, fingerprints, etc.), such replacement would be expensive and time consuming. The token binding solution described below also provides security even if the SDK software is compromised, but makes current versions of the SDK obsolete. Security is improved through the replacement SDK, as it prevents token usage using USB over IP techniques, prevents multiple instances of the SDK in the same local machine, and prevents the SDK from being used by a remote desktop.

Token Node Locking System Overview

Figure 1:
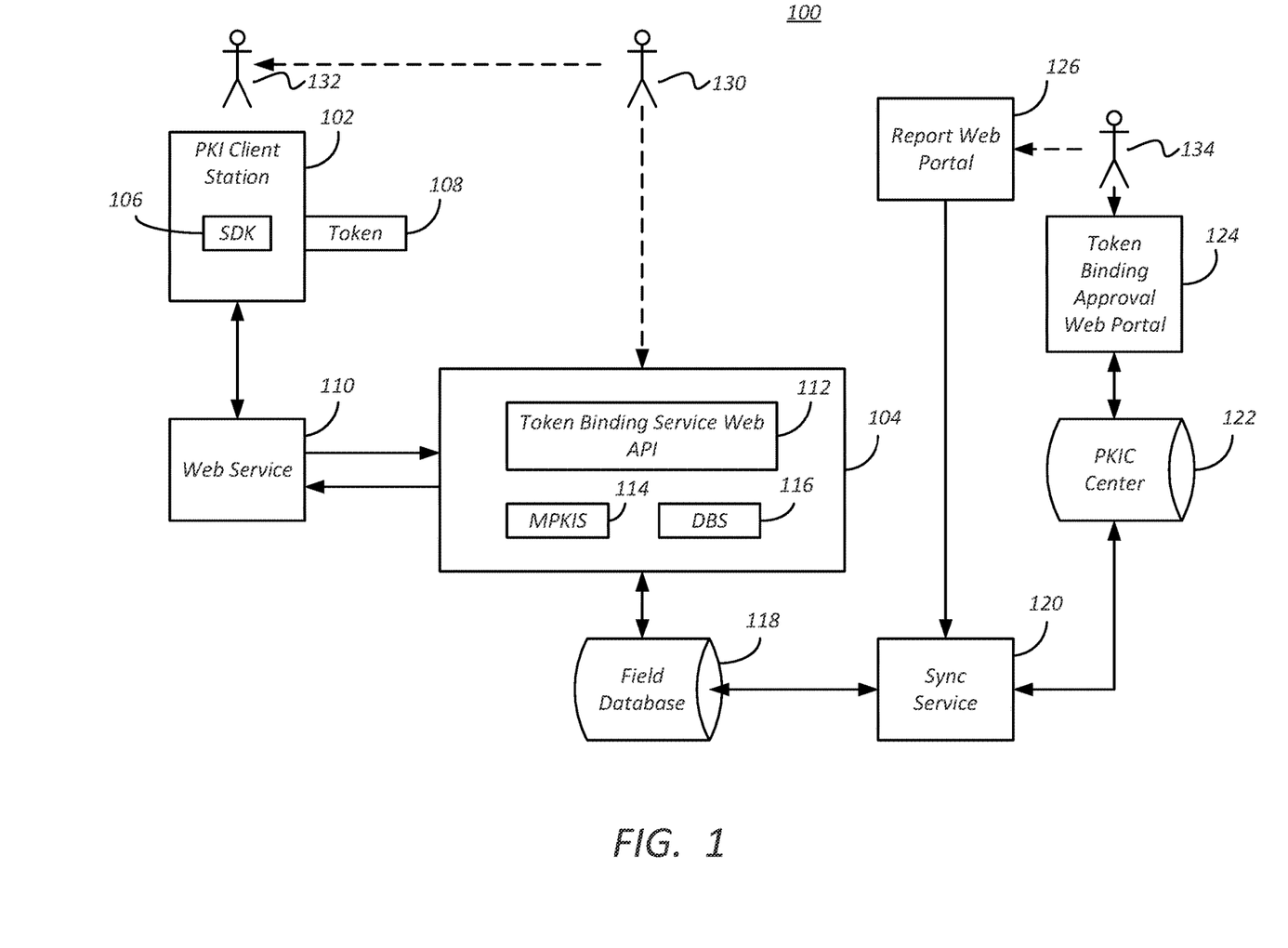
FIG. 1 is a diagram illustrating a PKI system.

FIG. 1 is a diagram illustrating a PKI system 100. The PKI system 100 uses hardware tokens 108 to lock nodes (e.g. PKI client stations 102) of the PKI system 100. The PKI system 100 includes a PKI client station 102 (also alternatively referred to hereinafter as a host device) communicatively coupled to a token binding service 104. A web service 110 provides an interface between the PKI client station 102 and the token binding service 104 to make PKIS/DBS requests and to receive responses having the PKIS/DBS. To secure this transaction, the SDK 106 executing on the PKI client station uses a hardware token 108 communicatively coupled to the PKI client station 102. The token 108 stores objects including public keys, certificates, and other data type objects which are considered public objects. These objects can be viewed and retrieved without logging in to the token 108 (e.g. a token password is not required). The token 108 also stores a private key (TLS_TOKEN_RSAPrivKey) and optionally, a secret key, which are sensitive. Such object types can only be viewed and used upon entry of the proper token password. The token password is also required to modify any object stored in the token 108. Token identifying information (such as a serial number or digital certificate) can be provided to the token binding service 104 via the SDK 106 and the web service 110.

A manager or PKI Champion (PKIC) 130 of the PKI system 100 deploys the SDK 106 and token 108 to the client, and the client deploys the PKI client station 102 and web service 110 using the token 109. The PKIC 130 also deploys the token binding service 104 to the field. The PKI client station 102, using the SDK 106 and the token 108, generates a PKIS/DBS request that includes an identifier of the token 108 and a fingerprint of the PKI client station 102. The token binding service 104 receives the request via the token binding service API 112, saves the token identifier, the fingerprint, and a timestamp of the request to a field database 118. The token binding service 104 enforces all validations, binding of tokens 108, rebinding of tokens 108, as well as cryptographic data requests. The Manufacturing PKI Service (MPKIS) provides PKI data, certificate, private key, and other cryptographic data to the PKI client station. The Data Block Signing (DBS) service is used to provision devices with identities (for example, serial numbers) and other information (e.g. lock codes) at manufacturing time.

Tokens 108 are typically not bound or re-bound without a approval, and this is implemented by the routing the request to a PKIC center database 122 that is accessed by a PKI Requestor 134 who uses a token binding approval web portal 124 to retrieve the request and respond to the request, again via the PKIC center database 122. The response is provided to the token binding service 104 and thence to the PKI client station 102 via the synchronization service 120. Report web portal 126 is used by the PKI Requestor 134 to provide information to the synchronization service, including when token binding requests are or should be granted and when they are or should be denied. As described further herein, the token stores at least two key pairs. The first key pair includes a private key TLS_TOKFN_RSAPrivKey that is generated by an application in a key generation facility that is used to sign MPKIS/DBS requests sent to the token binding service 104. The second key pair includes a binding public key BKP_RSAPrivKey and a binding private key BKP_RSAPrivKey generated by the SDK 106 in the field (e.g. service center) which is used for binding the token 108 and the host device 102 together.

Figure 2:
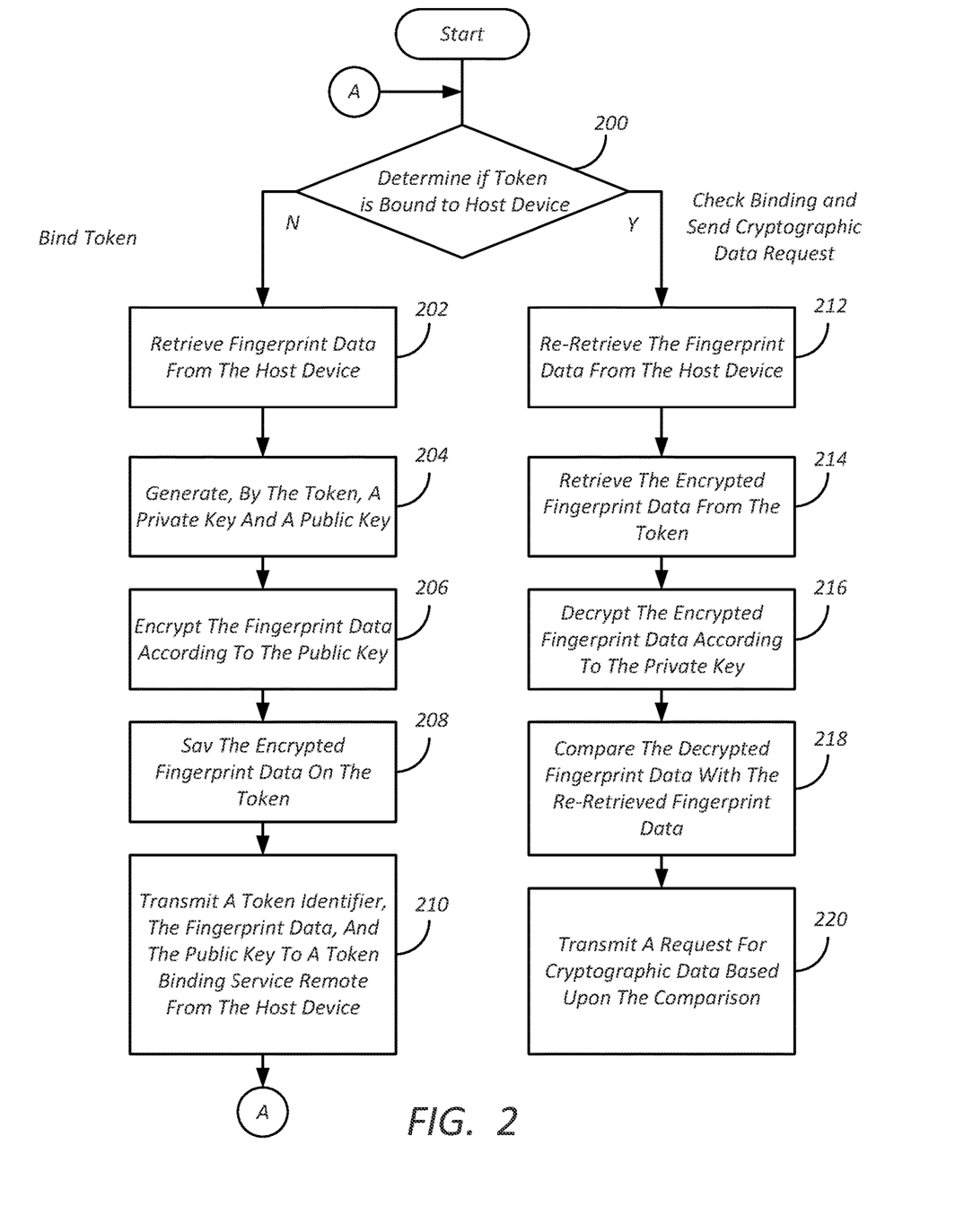
FIG. 2 is a diagram illustrating exemplary operations for binding a hardware token to a host device.

FIG. 2 is a diagram illustrating exemplary operations for binding a hardware token to a host device 102. Block 200 determines if the token 108 is bound to the host device (e.g. PKI Client station 102). In one embodiment, this is accomplished by checking to see if an encrypted fingerprint object (which is an encrypted version of fingerprint data of the host device 102, alternatively referred to hereinafter as "ENCRYPTED_FP") and a private binding key (hereinafter alternatively referred to as "BKP_RSAPrivKey") object already exists on the token 108. If both the encrypted fingerprint data and private binding key are stored by the token 108, it is determined that the token 108 is bound to the host device 102, and processing is routed to block 212 to check the status of the binding of the token 108 to the host device 102, and transmit a request for cryptographic data based upon the status of that binding. If either the encrypted fingerprint data or the private binding key are not stored by the token 108, the token 108 is not bound to the host device 102 processing is routed to blocks 202-210, which describe a process to bind the token 108 to the host device 102.

Token-Host Binding Process

The operations described below are used to bind the token 108 to the host device 102. These operations occur during instantiation of the token instance by the SDK 106, and the resulting token instance has the lifetime of the SDK 106.

Before generating binding information, the SDK 106 checks to see if the SDK 106 is being used in remote desktop session (RDP), for example by a remote (and unauthorized) PKI client station 102. If the SDK 106 is being used in a remote desktop session, that process is terminated (e.g. by throwing an exception). If the token 108 is not currently being used in a remote desktop session, the SDK 106 checks to see if a session data object exists on the token. A session data object is a temporary object which is allocated in token's volatile memory. A session data object can only exist on the token if and only if the process, which created it, is still running. The existence of session data object on the token implies that the host already has an active process which is using token to request the data. If such a session data object exists, SDK terminates the process (e.g. by throwing an exception). If the session data object does not exist, the SDK 106 creates a session data object in the token 108. The goal here is to prevent multiple processes in a machine from using the token at any given time.

Blocks 202-210 illustrate the process of generating binding data and binding the token 108 to the host device 102. The binding/rebinding of a token 108 and host device 102 occurs only once during the very first use of the token 108, and the token 108 remains bound to the host device 102 for as long as the fingerprint data obtained from the host device 108 is valid.

Turning first to block 202, the SDK 106 gathers fingerprint data (FP) of the host device 102. Such fingerprint data can include the serial number of the host device 102 and/or other information sufficient to generate a unique identity for the host device 102. In block 204, the SDK 106 generates a new key pair (for example, an RSA key pair (hereinafter referred to as a Binding Key Pair (BKP) and stores the key pair on the token. In one embodiment, the keys of the binding key pair are labeled, with the private binding key labeled "BKP_RSAPrivKey" and the public binding key labeled "BKP_RSAPubKey". Next, in block 206, the fingerprint data is encrypted according to the public binding key BKP_RSAPubKey. In block 208, the SDK 106 saves the encrypted fingerprint data on the token 108, for example, as an "ENCRYPTED_FP" data object. Finally, a token identifier, the fingerprint data, and the public key is transmitted to the token biding service (TBS) 104, as shown in block 210. In one embodiment, this accomplished by the SDK 106 transmitting a registration message having the token information (token ID), the fingerprint data, and the public key to the token binding service 104 via the web service 110.

In one embodiment, the operations of blocks 206-210 are implemented as follows using parameters that represent a proxy for the public key. In this embodiment, after generating the private binding key and the public binding key (block 204), the SDK 106 retrieves parameters from which the public key can be rederived (such as the modulus (n) and the exponent (e)) from the public key object BKP_RSAPubKey and deletes the public key object itself from the token 108. To encrypt the fingerprint data according to the public key, the SDK 106 encrypts the fingerprint data using parameters (n, e) parameters to generate $ENC(FP)_{BKP}$, and saves $ENC(FP)_{BKP}$ as the data object ENCRYPTED_FP. In this embodiment, the SDK 106 also transmits the public key to the token binding service 104 by transmitting attributes (n, e) in the registration message instead of the public key.

Once the registration message is transmitted to the token binding service 104, processing is returned to block 200 and this binding information generated in blocks 202-210 is used to enforce binding between the token 108 and the host device 102, as described further below.

Again, block 200 determines whether the token 108 is bound to the host device 102. Since both the encrypted fingerprint (ENCRYPTED_FP object) and the private binding key (BKP_RSAPrivKey object) are now stored on the token 108, block 200 determines that the token 108 is bound to the host device 102 and processing is routed to blocks 212-220 in which the binding information generated in blocks 202-210 is used to determine whether to transmit a request for cryptographic data or take other action.

In block 212, fingerprint data (FP) is again retrieved (re-retrieved) from the host device 102. In block 214, the SDK 106 retrieves the encrypted fingerprint data $ENC(FP)_{BKP}$ from the "ENCRYPTED_FP" data object stored in the token 108. In block 216, the SDK 106 decrypts the retrieved encrypted fingerprint data $ENC(FP)_{BKP}$ using the private binding key BKP_RSAPrivKey to generate decrypted fingerprint data $FP_{DEC}$. In block 218, the SDK 106 compares the decrypted fingerprint data with the re-retrieved fingerprint data. Finally, in block 200, the SDK 106 transmits a request for cryptographic data to the token binding service 104 according to the comparison performed in block 218.

Figure 3:
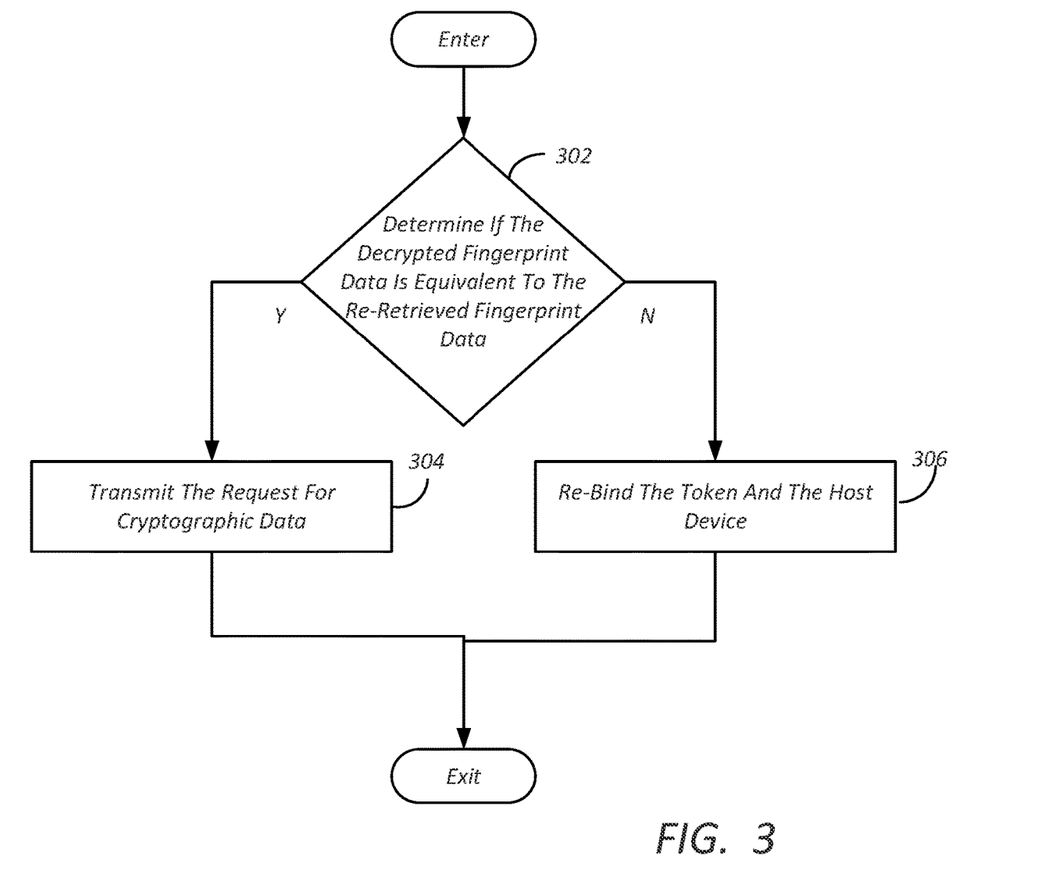
FIG. 3 is a diagram presenting illustrative operations for transmitting a request for cryptographic data to the token binding service based upon a comparison of the decrypted fingerprint data and the re-retrieved fingerprint data.

FIG. 3 is a diagram presenting illustrative operations for transmitting a request for cryptographic data to the token binding service 104 based upon a comparison of the decrypted fingerprint data and the re-retrieved fingerprint data. In block 302, the SDK 106 determines if the decrypted fingerprint data is equivalent to the re-retrieved fingerprint data (e.g. whether $FP=FP_{DEC}$ or whether the data matches). If the decrypted fingerprint data is equivalent to the re-retrieved fingerprint data, block 304 transmits the request for cryptographic data to the token binding service 104. This is accomplished by the SDK 106 opening a connection with the token binding service 104 via the web service 110, and transmitting the request. However, if the decrypted fingerprint data and the re-retrieved fingerprint data are not equivalent, block 306 re-binds the token 108 to the host device 102.

Figure 4:
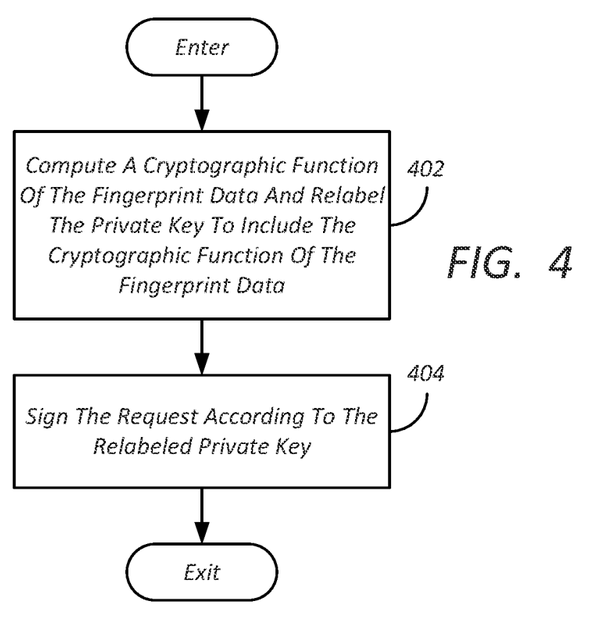
FIG. 4 is a diagram presenting illustrative operations for transmitting the request for cryptographic data.

FIG. 4 is a diagram presenting illustrative operations for transmitting the request for cryptographic data. In block 402, a cryptographic function (e.g. cryptographic hash) of the fingerprint data (including optional secret data such as a secret string of characters) is computed, and the token private key TLS_TOKFN_RSAPrivKey is relabeled to include the cryptographic function of the fingerprint data. In one example of this embodiment, the SDK 106 computes a SHA1(FP+SECRET STRING) with secure hash algorithm 1, and converts the result to the hexadecimal string <<HS>>. The secret string can be a unique value, a derived value, or part of modulus, but represents a secret known only to the SDK 106. The token private key TLS_TOKFN_RSAPrivKey is then renamed to include the hexadecimal string in its name, for example, by substitution to obtain <<HS>_RSAPrivKey. The SDK 106 then signs the request for cryptographic data with the renamed or relabeled token private key <<HS>_RSAPrivKey as shown in block 404. The signed request is then transmitted.

If strict security is required, the calculation of the label of the token private key used for signing requests is computed every time a request is made for cryptographic data. This requires extra processing, and may negatively affect the timeliness of the algorithms making requests for cryptographic data. If strict security is not required, the private key label used for signing cryptographic data requests may be generated in the token 108 and host device 102 binding process, saved, and used repeatedly for all requests.

Rebinding the Token to the Host Device

Returning to FIG. 3, if the decrypted fingerprint data is not equivalent to the re-retrieved fingerprint data, block 306 rebinds the token 108 to the host device 102. Before these operations commence, an approval process must be completed. In this process, PKI client station personnel 132 sends an email to PKI center personnel (hereinafter referred to as PKI Champion or PKIC) 130 about a token 108 that needs to be rebound to the PKI client station 102 due to hardware changes in the PKI client station 102 or moving the token 108 to a new PKI client station 102 (for example, when the previous PKI client station 102 is obsolete and in need of replacement. The PKIC 130 communicates the request to a PKI Requestor 134 to approve or reject the rebinding request. The PKI Requestor 134 communicates approval or rejection of the request to the PKI client station personnel 132. If the rebinding request is approved, the PKI Requestor 134 sends such approval to the token binding service 104.

Figure 5:
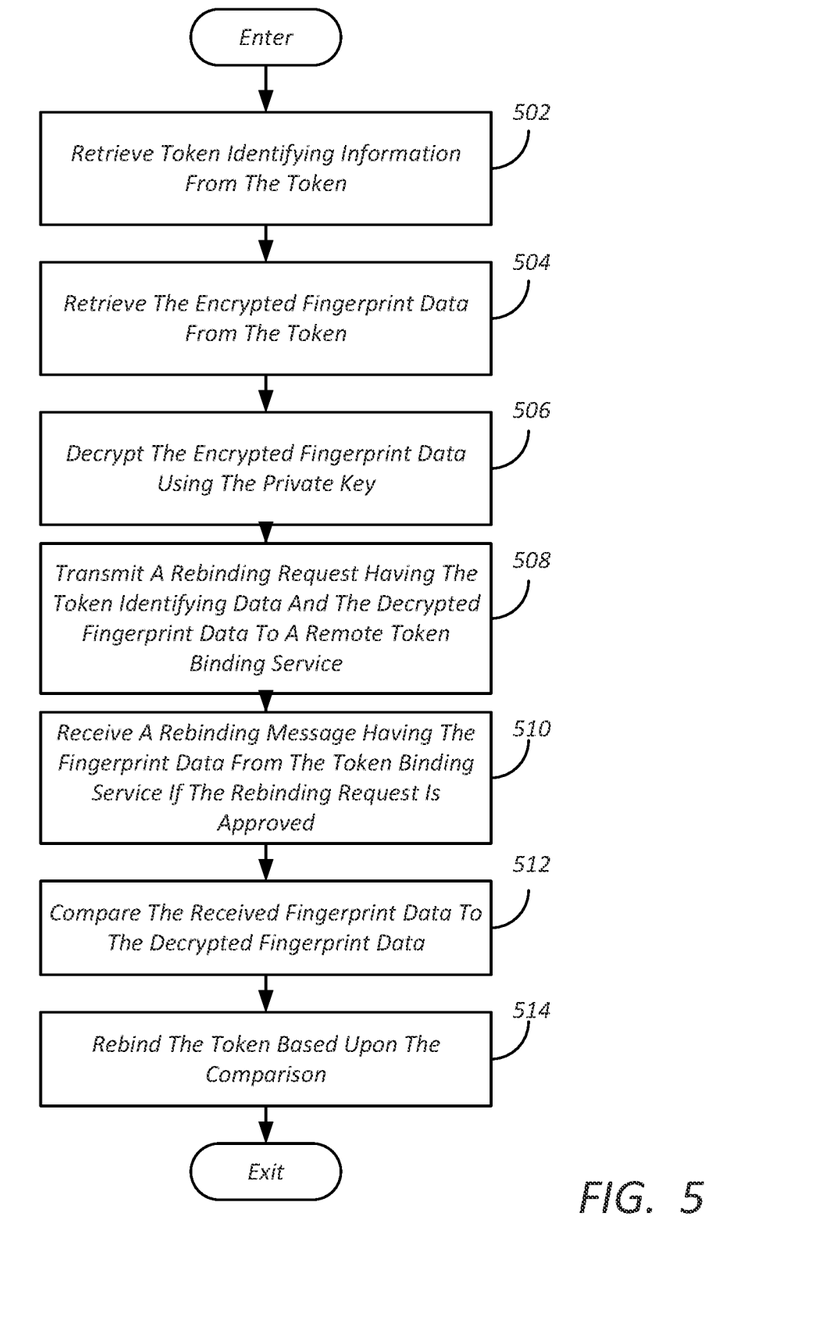
FIG. 5 is a diagram illustrating exemplary operations for rebinding the token to the host device.

FIG. 5 is a diagram illustrating exemplary operations for rebinding the token 108 to the host device 102. These operations are synchronous, meaning that the SDK 106 sends the request to the TBS 104 and receives a response from the TBS 104 immediately (the SDK 106) does not need to wait for the approval process described above, which could take several days. In block 502, the SDK 106 retrieves token identifying information from the token 108. In one embodiment, the token identifying information comprises a serial number (SN) of the token 108. In block 504, the SDK 106 retrieves the encrypted fingerprint data from the token 108. In one embodiment, this is accomplished by retrieving the encrypted fingerprint data $ENC(FP)_{BKP}$ from the ENCRYPTED_FP data object on the token 108. In block 506, the SDK 106 decrypts the encrypted fingerprint data ENC(FP)$_{BKP}$ using the private binding key BKP_RSAPrivKey to produce the decrypted fingerprint data FP$_{DEC}$. In block 508, the SDK 106 transmits a rebinding request having the decrypted fingerprint data to the token binding service 104. In one embodiment, the SDK also generates a Nonce comprising 20 bytes of random data, and includes that nonce in the rebinding request. The rebinding request is transmitted to the token binding service 104 via a two-way secure sockets layer (SSL) web API/service.

In block 510, the token binding service 104 receives the rebinding message having the token identifying data, the fingerprint data, and the optional nonce. The token binding service 104 checks to determine whether the rebinding request has been approved. If it has not been approved, the request is rejected and logged as an denied request, with the token 108 remaining unbounded. If the request has been approved, the token binding service 104 transmits a rebinding message having the fingerprint data.

In one embodiment, the rebinding message comprises a hash of the public binding key BKP_PubKey encrypted by the public binding key BKP_PubKey. In one example of this embodiment, the token binding service generates a message:
M=TLV(SHA1(BKP_PubKey)|/TLV(Nonce)|TLV(Random_Value)
where: SHA1 refers to secure hash algorithm 1, BKP_PubKey is the public binding key, the Nonce is the Nonce received in the binding request, Random_Value is an array of elements having random byte values, but no elements having zero value, "|" is a concatenation operation, and TLV(•) refers to the type, length and value of "•". The value SHA1(BKP_PubKey) is used to assure the token binding service 104 and the SDK 106 are authenticated and know one another. The Nonce prevents multiple uses of the same token, in case the value of M is compromised. The Random_Value makes it more difficult for an attacker to guess the binding response value. In this embodiment, the token binding service 104 encrypts the message M (which includes a hash of the public binding key) using the public binding key BKP_PubKey to produce ENC(M)$_{BPK}$. The token binding service 104 then composes a rebinding message M' sent to the PKI client station 102 as a concatenation of the fingerprint and the encrypted message, or:
M'=TLV(FP|ENC(M))$_{BPK}$ The TLV(FP) portion of the rebinding message is transmitted to the PKI client station 102 to prevent unnecessary decryption operations if the fingerprint comparison does not match.

In block 510, the rebinding message is received in the host device 102 from the token binding service 104 via the web service 110. In block 512, the received fingerprint data is compared to the decrypted fingerprint data obtained in block 506, and in block 514, the token 108 is rebound to the host device 102 based upon the comparison.

Figure 6:
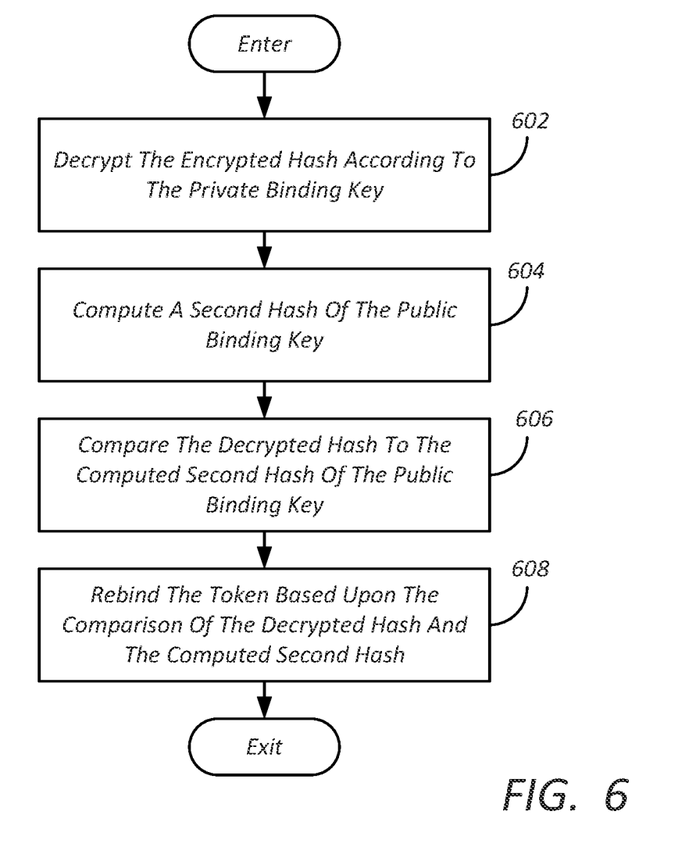
FIG. 6 is diagram of a processor for rebinding the token to the host device.

FIG. 6 is diagram of a processor for rebinding the token 108 to the host device in embodiments where the rebinding message comprises a hash of the public binding key BKP_PubKey encrypted by the public key BKP_PubKey. In block 602, the encrypted hash is decrypted according to the private binding key BKP_PrivKey. In block 604, a second hash of the public binding key BKP_PubKey is computed. In block 606, the decrypted hash of the public binding key is compared to the computed second hash of the public binding key, and in block 608, the token 108 is rebound based upon that comparison.

In the embodiment described above in which the rebinding message M' is generated and sent to the host device 102, this is accomplished as follows. First, the SDK 106 parses the binding message M' to recover the fingerprint TLV(FP) and the encrypted message ENC(M)$_{BPK}$. In block 510, the fingerprint data from the binding message is compared with the decrypted fingerprint data obtained in block 506. If the fingerprint data from these two sources does not match, the SDK 106 terminates the rebinding process. However, if the fingerprint data from the two sources match, the SDK 106 checks other parameters in the rebinding message M'.

The SDK 106 decrypts the encrypted message ENC(M)$_{BPK}$ using the private binding key BKP_PrivKey stored on the token 108. If this decryption operation fails, processing is halted. If the decryption succeeds, the result is that the message M is recovered. As M is a concatenation of several factors, the SDK 106 parses M to recover these factors including the hash of the public binding key (SHA1(BPK_PubKey)), the nonce, and the random value.

The SDK 106 then checks the Random_Value portion of the parsed message to determine if any element/value in the array equals zero. If any of the elements/values in the Random_Value array portion of the parsed message equals zero, the SDK 106 halts the rebinding process. If the Random_Value portion of the parsed message does not contain zero, the SDK 106 continues nonce received in the message M and compares it to the nonce generated by the SDK 106 and included as a part of the binding request as described above. If the Nonces do not match, the binding process is terminated. If the Nonces match, the SDK 106 computes a hash of the public binding key (SHA1(BPK_PubKey)) and compares this hash to the hash of the public binding key received in the rebinding message M (blocks 602-606). If the hashes do not match, the rebinding process is terminated. If the hashes match, the rebinding process continues.

In one embodiment, the above computation of the hash is accomplished by retrieving the (n, e) attributes from the private binding key BKP_RSAPrivKey object stored on the token 108, and using the attributes to construct a digital certificate (such as an X.509 digital certificate) in a public key format, and hashing the resulting public key.

Finally, in embodiments where the SDK 106 renamed the token private key to <<HS>>_RSAPrivKey, the SDK 106 renames the token private key to the original label of TLS_TOKFN_RSAPrivKey. The SDK 106 then removes the private binding key BKP_RSAPrivKey and the encrypted fingerprint data ENCRYPTED_FP data objects from the token 108. At this point, the token 108 has reverted back to its original state before the binding process, and is no longer bound to the host device 102. So that cryptographic data might be retrieved, the token 108 must now be bound to the host device 102, by performing the operations of blocks 202-210 of FIG. 2.

Hardware Environment

Figure 7:
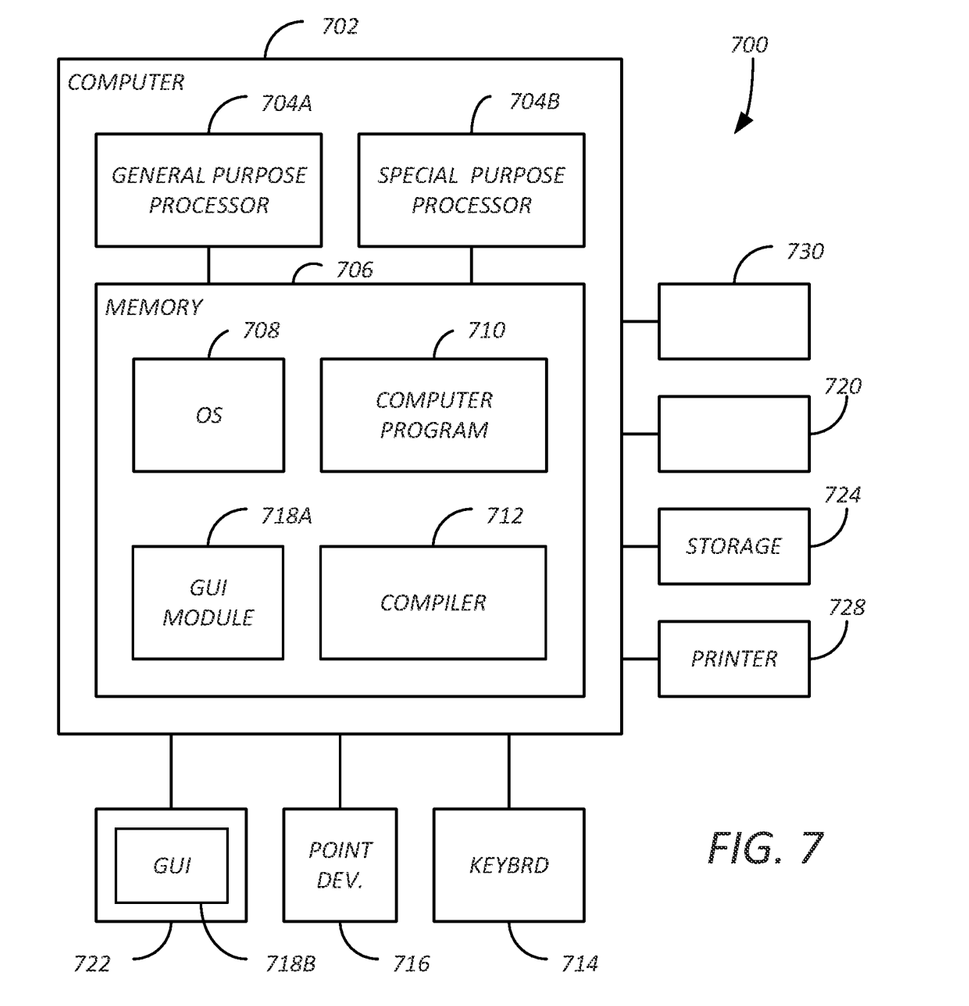
FIG. 7 illustrates an exemplary computer system that could be used to implement processing elements of the PKI system.

FIG. 7 illustrates an exemplary computer system 700 that could be used to implement processing elements of the PKI system, including the PKI client station 102, the token 108, the web service 110, the token binding service 104, the synchronization service 120, PKIC center 122, and portals 126 and 124. The computer 702 comprises a processor 704 and a memory, such as random access memory (RAM) 706. The computer 702 is operatively coupled to a display 722, which presents images such as windows to the user on a graphical user interface 718B. The computer 702 may be coupled to other devices, such as a keyboard 714, a mouse device 716, a printer 728, etc. Of course, those skilled in the art will recognize that any combination of the above components, or any number of different components, peripherals, and other devices, may be used with the computer 702.

Generally, the computer 702 operates under control of an operating system 708 stored in the memory 706, and interfaces with the user to accept inputs and commands and to present results through a graphical user interface (GUI) module 718A. Although the GUI module 718B is depicted as a separate module, the instructions performing the GUI functions can be resident or distributed in the operating system 708, the computer program 710, or implemented with special purpose memory and processors. The computer 702 also implements a compiler 712 which allows an application program 710 written in a programming language such as COBOL, C++, FORTRAN, or other language to be translated into processor 704 readable code. After completion, the application 710 accesses and manipulates data stored in the memory 706 of the computer 702 using the relationships and logic that was generated using the compiler 712. The computer 702 also optionally comprises an external communication device such as a modem, satellite link, Ethernet card, or other device for communicating with other computers.

In one embodiment, instructions implementing the operating system 708, the computer program 710, and the compiler 712 are tangibly embodied in a computer-readable medium, e.g., data storage device 720, which could include one or more fixed or removable data storage devices, such as a zip drive, floppy disc drive 724, hard drive, CD-ROM drive, tape drive, etc. Further, the operating system 708 and the computer program 710 are comprised of instructions which, when read and executed by the computer 702, causes the computer 702 to perform the operations herein described. Computer program 710 and/or operating instructions may also be tangibly embodied in memory 706 and/or data communications devices 730, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

The foregoing discloses an apparatus, method and system for requesting cryptographic data is described. In one embodiment, the method comprises determining if the token is bound to the host device, and if the token is not bound to the host device, binding the token to the host device. Binding the token to the host device comprises retrieving fingerprint data from the host device, generating, by the token, a private binding key and a public key, encrypting the fingerprint data according to the public key, saving the encrypted fingerprint data on the token, and transmitting a token identifier, the fingerprint data, and the public key to a token binding service remote from the host device. If the token is bound to the host device, the method comprises re-retrieving the fingerprint data from the host device, retrieving the encrypted fingerprint data from the token, decrypting the encrypted fingerprint data according to the private binding key, comparing the decrypted fingerprint data with the re-retrieved fingerprint data, and transmitting a request for cryptographic data based upon the comparison.

Implementations may include one or more of the following features:

The methods described above, wherein transmitting a request for cryptographic data based upon the comparison includes: determining if the decrypted fingerprint data is equivalent to the re-retrieved fingerprint data; transmitting the request if the decrypted fingerprint data is equivalent to the re-retrieved fingerprint data; and re-binding the token and the host device if the fingerprint data is not equivalent to the re-retrieved fingerprint data.

Any of the methods described above, wherein transmitting the request if the decrypted fingerprint data is equivalent to the re-retrieved fingerprint data includes: computing a cryptographic function of the fingerprint data and relabeling a token private key to include the cryptographic function of the fingerprint data; and signing the request according to the relabeled token private key.

Any of the methods described above, wherein: the cryptographic function is a cryptographic hash of the fingerprint data and a secret string of characters.

Any of the methods described above, wherein re-binding the token and the host device if the fingerprint data is not equivalent to the re-retrieved fingerprint data includes: retrieving token identifying information from the token; retrieving the encrypted fingerprint data from the token; decrypting the encrypted fingerprint data using the private binding key; transmitting a rebinding request having the token identifying information and the decrypted fingerprint data to a remote token binding service; receiving a rebinding message having the fingerprint data from the token binding service if the rebinding request is approved; comparing the received fingerprint data to the decrypted fingerprint data; and rebinding the token based upon the comparison.

Any of the methods described above, wherein: the rebinding message further includes a hash of the public binding key encrypted by the public binding key; and rebinding the token based upon the comparison includes: decrypting the encrypted hash according to the private binding key; computing a second hash of the public key; comparing the decrypted hash to the computed second hash of the public key; and rebinding the token based upon the comparison of the decrypted hash and the computed second hash.

Any of the methods described above, wherein: the rebinding request further includes a first nonce and a first random value; the rebinding message further includes a second nonce and a second random value; the token is rebound further upon a comparison of: the first nonce and the second nonce; and the first random value and the second random value.

Another embodiment is evidenced by an apparatus for requesting cryptographic data is described. The apparatus includes a processor; a memory, communicatively coupled to the processor, the memory storing processor instructions including processor instructions for: determining if the token is bound to the host device; binding the token to the host device if the token is not bound to the host device, binding the token to the host device, including: retrieving fingerprint data from the host device; generating, by the token, a private binding key and a public key; encrypting the fingerprint data according to the public key; saving the encrypted fingerprint data on the token; transmitting a token identifier, the fingerprint data, and the public key to a token binding service remote from the host device; transmitting a request for cryptographic data if the token is bound to the host device, including: re-retrieving the fingerprint data from the host device; retrieving the encrypted fingerprint data from the token; decrypting the encrypted fingerprint data according to the private binding key; comparing the decrypted fingerprint data with the re-retrieved fingerprint data; and transmitting a request for cryptographic data based upon the comparison.

Other implementations may include one or more of the following features:

Any apparatus described above, The apparatus wherein the processor instructions for transmitting a request for cryptographic data based upon the comparison include processor instructions for: determining if the decrypted fingerprint data is equivalent to the re-retrieved fingerprint data; transmitting the request if the decrypted fingerprint data is equivalent to the re-retrieved fingerprint data; and re-binding the token and the host device if the fingerprint data is not equivalent to the re-retrieved fingerprint data.

Any apparatus described above, wherein the processor instructions for transmitting the request if the decrypted fingerprint data is equivalent to the re-retrieved fingerprint data include processor instructions for: computing a cryptographic function of the fingerprint data and relabeling a token private key to include the cryptographic function of the fingerprint data; and signing the request according to the relabeled token private key.

Any apparatus described above, wherein: the cryptographic function is a cryptographic hash of the fingerprint data and a secret string of characters.

Any apparatus described above, wherein the processor instructions for re-binding the token and the host device if the fingerprint data is not equivalent to the re-retrieved fingerprint data include processor instructions for: retrieving token identifying information from the token; retrieving the encrypted fingerprint data from the token; decrypting the encrypted fingerprint data using the private binding key; transmitting a rebinding request having the identifying information and the decrypted fingerprint data to a remote token binding service; receiving a rebinding message having the fingerprint data from the token binding service if the rebinding request is approved; comparing the received fingerprint data to the decrypted fingerprint data; and rebinding the token based upon the comparison.

Any apparatus described above, wherein: the rebinding message further includes a hash of the public binding key encrypted by the public binding key; and the processor instructions for rebinding the token based upon the comparison include processor instructions for: decrypting the encrypted hash according to the private binding key; computing a second hash of the public key; comparing the decrypted hash to the computed second hash of the public key; and rebinding the token based upon the comparison of the decrypted hash and the computed second hash.

Any apparatus described above, wherein: the rebinding request further includes a first nonce and first random data; the rebinding message further includes a second nonce and a second random data; the token is rebound further upon a comparison of: the first nonce and the second nonce; and the first random data and the second random data.

What is claimed is:

1. A method of managing a binding of a hardware token to a host device, the method comprising:
   determining whether or not the token is bound to the host device;
   when the token is not bound to the host device, binding the token to the host device, and comprising;
      retrieving fingerprint data from the host device;
      generating, by the token, a private binding key and a public key;
      encrypting the fingerprint data according to the public key;
      saving the encrypted fingerprint data on the token;
      transmitting a token identifier, the fingerprint data, and the public key to a token binding service remote from the host device;
   when the token is bound to the host device:
      re-retrieving the fingerprint data from the host device;
      retrieving the encrypted fingerprint data from the token;
      decrypting the encrypted fingerprint data according to the private binding key;
      comparing the decrypted fingerprint data with the re-retrieved fingerprint data; and
      transmitting a request for cryptographic data based upon the comparison.

2. The method of claim 1, wherein transmitting a request for cryptographic data based upon the comparison comprises:
   determining if the decrypted fingerprint data is equivalent to the re-retrieved fingerprint data;
   transmitting the request if the decrypted fingerprint data is equivalent to the re-retrieved fingerprint data; and
   re-binding the token and the host device if the fingerprint data is not equivalent to the re-retrieved fingerprint data.

3. The method of claim 2, wherein transmitting the request if the decrypted fingerprint data is equivalent to the re-retrieved fingerprint data comprises:
   computing a cryptographic function of the fingerprint data and relabeling a token private key to include the cryptographic function of the fingerprint data; and
   signing the request according to the relabeled token private key.

4. The method of claim 3, wherein:
   the cryptographic function is a cryptographic hash of the fingerprint data and a secret string of characters.

5. The method of claim 2, wherein re-binding the token and the host device if the fingerprint data is not equivalent to the re-retrieved fingerprint data comprises:
   retrieving token identifying information from the token;
   retrieving the encrypted fingerprint data from the token;
   decrypting the encrypted fingerprint data using the private binding key;
   transmitting a rebinding request having the token identifying information and the decrypted fingerprint data to a remote token binding service;
   receiving a rebinding message having the fingerprint data from the token binding service if the rebinding request is approved;
   comparing the received fingerprint data to the decrypted fingerprint data; and
   rebinding the token based upon the comparison.

6. The method of claim 5, wherein:
the rebinding message further comprises a hash of the public binding key encrypted by the public binding key; and
rebinding the token based upon the comparison comprises:
  decrypting the encrypted hash according to the private binding key;
  computing a second hash of the public key;
  comparing the decrypted hash to the computed second hash of the public key; and
  rebinding the token based upon the comparison of the decrypted hash and the computed second hash.

7. The method of claim 6, wherein:
the rebinding request further comprises a first nonce and a first random value;
the rebinding message further comprises a second nonce and a second random value;
the token is rebound further upon a comparison of:
  the first nonce and the second nonce; and
  the first random value and the second random value.

8. An apparatus for managing a binding of a hardware token to a host device, comprising:
a processor;
a memory, communicatively coupled to the processor, the memory storing processor instructions comprising processor instructions for:
  determining whether or not the token is bound to the host device;
  binding the token to the host device when the token is not bound to the host device, and comprising;
  retrieving fingerprint data from the host device;
  generating, by the token, a private binding key and a public key;
  encrypting the fingerprint data according to the public key;
  saving the encrypted fingerprint data on the token;
  transmitting a token identifier, the fingerprint data, and the public key to a token binding service remote from the host device;
  transmitting a request for cryptographic data when the token is bound to the host device, and comprising:
  re-retrieving the fingerprint data from the host device;
  retrieving the encrypted fingerprint data from the token;
  decrypting the encrypted fingerprint data according to the private binding key;
  comparing the decrypted fingerprint data with the re-retrieved fingerprint data; and
  transmitting a request for cryptographic data based upon the comparison.

9. The apparatus of claim 8, wherein the processor instructions for transmitting a request for cryptographic data based upon the comparison comprise processor instructions for:
  determining if the decrypted fingerprint data is equivalent to the re-retrieved fingerprint data;
  transmitting the request if the decrypted fingerprint data is equivalent to the re-retrieved fingerprint data; and
  re-binding the token and the host device if the fingerprint data is not equivalent to the re-retrieved fingerprint data.

10. The apparatus of claim 9, wherein the processor instructions for transmitting the request if the decrypted fingerprint data is equivalent to the re-retrieved fingerprint data comprise processor instructions for:
  computing a cryptographic function of the fingerprint data and relabeling a token private key to include the cryptographic function of the fingerprint data; and
  signing the request according to the relabeled token private key.

11. The apparatus of claim 10, wherein:
the cryptographic function is a cryptographic hash of the fingerprint data and a secret string of characters.

12. The apparatus of claim 9, wherein the processor instructions for re-binding the token and the host device if the fingerprint data is not equivalent to the re-retrieved fingerprint data comprise processor instructions for:
  retrieving token identifying information from the token;
  retrieving the encrypted fingerprint data from the token;
  decrypting the encrypted fingerprint data using the private binding key;
  transmitting a rebinding request having the identifying information and the decrypted fingerprint data to a remote token binding service;
  receiving a rebinding message having the fingerprint data from the token binding service if the rebinding request is approved;
  comparing the received fingerprint data to the decrypted fingerprint data; and
  rebinding the token based upon the comparison.

13. The apparatus of claim 12, wherein:
the rebinding message further comprises a hash of the public binding key encrypted by the public binding key; and
the processor instructions for rebinding the token based upon the comparison comprise processor instructions for:
  decrypting the encrypted hash according to the private binding key;
  computing a second hash of the public key;
  comparing the decrypted hash to the computed second hash of the public key; and
  rebinding the token based upon the comparison of the decrypted hash and the computed second hash.

14. The apparatus of claim 13, wherein:
the rebinding request further comprises a first nonce and first random data;
the rebinding message further comprises a second nonce and a second random data;
the token is rebound further upon a comparison of:
  the first nonce and the second nonce; and
  the first random data and the second random data.

* * * * *